S. STUTZ.

Coal-Washing Machine.

No. 9,011. Reissued Dec. 30, 1879.

Attest:

Clarence Poole

Warren Seely

Inventor:

Sebastian Stutz by Ellis Spear

Attyp

UNITED STATES PATENT OFFICE.

SEBASTIAN STUTZ, OF PITTSBURG, PENNSYLVANIA.

IMPROVEMENT IN COAL-WASHING MACHINES.

Specification forming part of Letters Patent No. 188,691, dated March 20, 1877; Reissue No. 9,011, dated December 30, 1879; application filed January 28, 1879.

*To all whom it may concern:*

Be it known that I, SEBASTIAN STUTZ, of Pittsburg, Allegheny county, Pennsylvania, have invented an Improvement in Coal Washing or Separating Machinery, of which the following is a specification.

My invention consists in the combination and arrangement of an apparatus having for its object the separation of coal from the slate, sulphur, &c., previous to coke-manufacturing.

Figure 1:
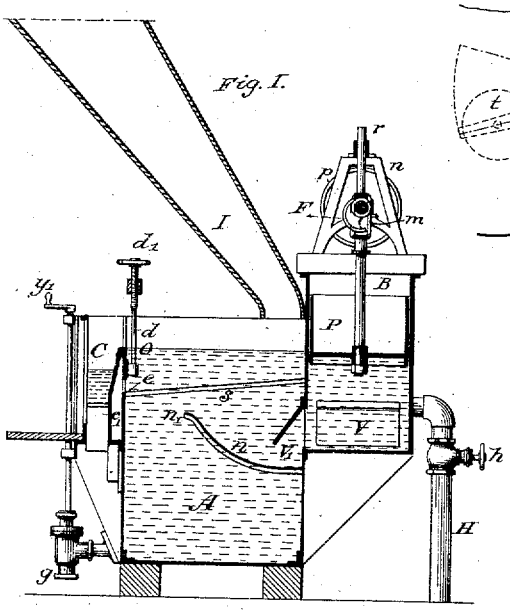
Figure 5:
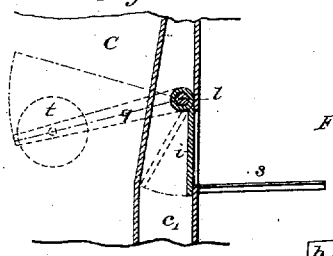
Figure 2:
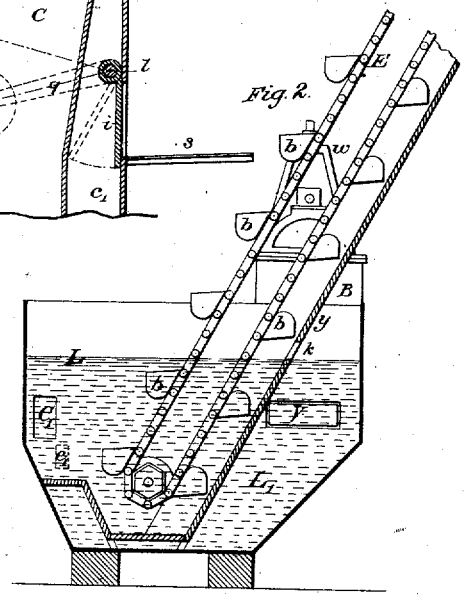
Figure 3:
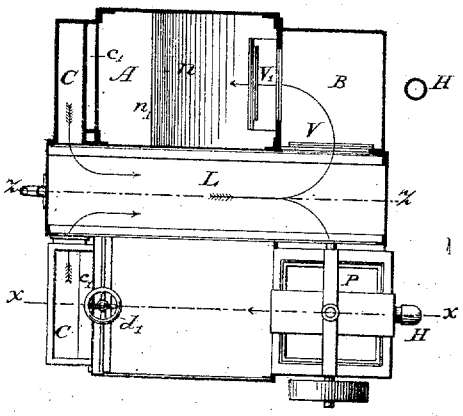
Figure 4:
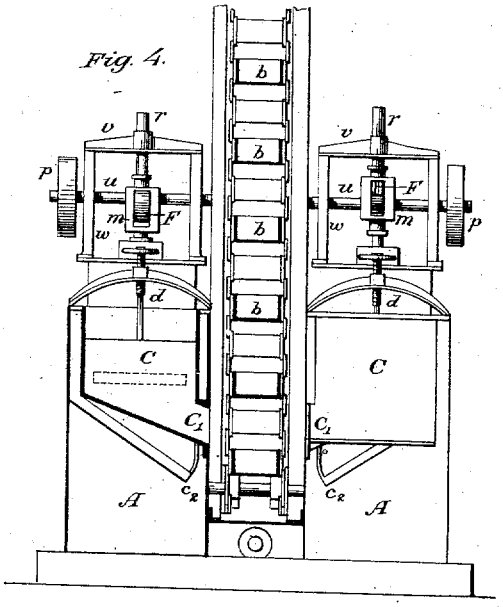

The annexed drawings represent at Figure 1 a vertical section taken at *x x* of Fig. 3; Fig. 2, a vertical section taken at *z z* of Fig. 3; Fig. 3, one half a horizontal section taken through the valves V V′ of Fig. 1. (The other half represents a top view of the apparatus.) Fig. 4 is a front view, of which, on the left-side part, the piece C′ is represented in section, and also a part of the coal-receiving box L, in order to show the chain and buckets. Fig. 5 represents a vertical section of a valve arrangement for the outlet of the stones, &c.

Two rectangular boxes, A A, are provided with screens or sieves *s s*, on which a layer of crushed coal is brought by means of the inclined plane I.

At the front side of the boxes A A channels C C are fixed to catch the delivered coal and slate, &c., separately, according to their gravity. Other boxes, B B, provided with pistons P P, are attached on the rear part of the boxes A A.

Between the latter boxes, forming two different separators, a third box, L, is located, which is common to both separators, and in which the delivered coal and water are received.

Communication between the different parts A, B, C, and L is secured by the valve-openings V V′, the delivery O, the slate-outlet *e*, and the opening C.

The separation of the coal from the slate, sulphur, &c., is effected by the action of a current of water forced alternately below the sieve *s*, supporting the layer of coal, by means of the piston P. The movement of the latter is obtained from the cam F, and the operation of the apparatus is as follows: The previously-crushed coal is brought upon the sieve *s* through the inclined plane I, and having reached the height of the delivery-edge *o*, or below, is lifted up by the action of the water-current, according to the density of the pieces of coal, slate, &c., composing the layer of material. Their gradual fall or descent, after being lifted up, will be with more or less rapidity, so that the heavier pieces of stones, &c., will be deposited first upon the sieve *s*, and before the pieces of coal can do this. The density of the latter being less, they consequently will settle immediately on top of the layer of stones, &c., provided that the action of water is not interfered with.

Experience has shown that in order to obtain a complete separation of a material composed of pieces having different densities, the action of the water, by lifting up the material, must be a sudden one, and the interval between two consecutive strokes must be sufficient to allow the necessary time for the material to deposit. This movement is accomplished by means of a differential cam, F, fixed upon the shaft *u*, and receiving its rotary movement through the pulley *p*. The box-shaped piston P is raised up by a slow and uniformly-progressing speed until it has attained its highest position. This is done by the aid of the guide-piece *m*, which is forked or composed of four legs or standards placed a sufficient distance apart to admit the cam F in one direction and the cam-shaft *u* in the other, as shown in Figs. 1 and 4, and is fixed to the piston-rod *r*, and upon which the action of the cam F is transmitted. The upper part of the piston-rod *r* is kept in its vertical position by means of the cross-piece *v*, supported and attached to the top of the brackets *w w*; but this could only be considered as an additional guide, not essential to the operation of the device, the extension of the piston-rod above the guide-piece being rendered unnecessary by the use of such guide-piece. During the time necessary for the rise of the piston P clean water is forced below the latter through the supply-pipe H to fill up part of the empty space. The cam F, having lifted up the piston P to its utmost extent, will soon let escape the fork-shaped guide-piece *m*, so that the piston P, becoming free, falls down upon the body of water. The sudden shock to the latter will produce a current, which acts with great force below the layer of coal at the sieve *s*. At each stroke a certain amount of coal and water is delivered into the channel C, from which it descends into the box L.

The great objection made to this kind of separators heretofore constructed has been the loss of power and time in overcoming the inertia of the large body of water and the interference of the action of the water-current during the upward movement of the piston. This objection I have overcome by my arrangement.

As to the first objection—the loss of power and time in overcoming the inertia of the water—I have divided the latter into two parts, the current-water and the dead-water. By means of the curved partition *n* the whole current of the water coming from the box B is forced directly toward the sieve *s* and the layer of coal without coming in contact with the dead-water; and as this current is a comparatively small body of water, the power necessary to produce it will be less than in separators, where the sieve and material together are reciprocated.

Another advantage of the partition *n* is, that the fine pieces of sulphur, slate, &c., falling through the openings of the sieve *s* upon the partition *n* will be forced by the current of the water down over the edge *n*, and will settle at the bottom of the box A. Therefore the current of clean water cannot be mixed with the fine slate and sulphur pieces suspended in the water, as is the case in other separators. By an appropriate opening below the box B the fine seam-sediment of slate and sulphur, &c., is from time to time taken out of the box A, and the latter washed and cleaned.

The second objection—the interference with the current—I have overcome by means of the valve V—that is, by separating temporarily the water of the box A from that of the box B for the interval the piston P is lifted up. The position of the piston P shown by Fig. 1 being the lowest, the valve V has been opened by the current of the water, and will be closed by the back-pressure of the water of the box A as soon as the piston begins to rise, whereby the water-level in the box A is kept constantly at the height of the delivery-opening *o*.

For the purpose of facilitating the accumulation of the stones and other heavier pieces at the opening *e*, at the front edge of the sieve *s*, the latter is inclined in its direction.

In Figs. 1, 3, and 4 a slide or gate arrangement is shown, by which the passage *e* can be opened or closed, in order to deliver the accumulated stones, &c. The latter fall into the inclined channel $c'$ and through the opening $c^2$ at the outside of the separator. The adjusting of the slide is accomplished by means of the screw *d* and hand-wheel $d'$.

Instead of the above arrangement, I may adopt the one shown by Fig. 5, which can be so regulated that its action becomes an automatic one—that is, the pressure of the accumulated stones will open the valve *i* as soon as they have reached a certain height.

The valve *i*, having a rotary movement, is fixed upon a small shaft, *l*, which, at one end, outside of the box A, is provided with a lever, *q*, and a counter-weight, *t*. By moving the latter from or toward the center of rotation the movement of the valve *i* can be easily regulated.

The object of having both the delivered coal and water pass together into a separate box, L, is to prevent the small particles of coal from being flooded away by the used water. This is contrary to what has been usually done, and the advantage obtained by allowing the fine coal to settle down and be saved is very important.

The level of the water in the inside of the box L is kept somewhat lower than the one of the box A, so that the delivered coal slides more easily down the inclined plane C into the box L. The latter box, L, is divided into two different parts, L and L′. The water, having deposited the fine coal in the first part, flows through the opening *k* of the dividing-partition into the part L′, and from there to the outside by passing below L and through the valve *g*. The opening of the latter is adjusted and regulated by the crank $g'$. Any other slide or gate arrangement might also be used.

A chain, E, provided with buckets *b b b*, takes the clean coal out of the box L, to be stored either in hoppers or in coal-cars previous to its introduction into the coke-ovens.

As already stated, the supply of fresh water is taken below the piston through the pipe H, and can be regulated by means of the valve *h*.

A further great advantage which I have combined with the above-described arrangement consists in using part of the same water after it has become clear. At many coal-mines the clean water is scarce, (the water coming out of the mines contains generally too much sulphuric acid, which makes it unsuitable for use in separating coal for the manufacture of coke,) and pure water cannot be procured in sufficient quantity. In such cases the water, instead of flowing out of the compartment L′, is taken again into the box B, below the piston P, by passing through the valve-opening V, and only so much is let out as is necessary.

In Fig. 3 the circulation of the water is indicated by the arrows. Instead of having the coal-receiving box L located between two separators, it can be as well located at the outside of two or more separators having a common delivery-channel for the coal and water. In such a case communication for using the same water again is made either through the rear or the bottom of the boxes B B.

The advantages of these devices consist, first, in the combination and arrangement of an apparatus whereby the separation of coal from slate, sulphur, &c., can be effected at the least expense possible; second, in making this separation as nearly perfect as can be; third, in the saving of the fine coal; and, fourth, in using the same water many times, thus specially fitting the apparatus for mines where other separators cannot be worked.

Having thus described my invention, what I claim as new, and desire to have secured by Letters Patent, is—

1. A coal-washing apparatus consisting of the two chambers with their appropriate sieves, pistons, and valves, and an intermediate chamber, into which the coal is delivered from both.

2. A coal-washing apparatus having the two chambers A A and the intermediate chambers, L, chambers B B, with pistons operating alternately on the masses of coal in the boxes A A, and the valves V V′, as and for the purposes set forth.

3. The chambers A A, having sieves *s s*, inclined ways C C, leading into the central chamber, L, and the valve-passages *e e*, as set forth.

4. The partition *n* within the box A, and in combination with the valve V′ and the sieve *s*, said partition being arranged in relation to the other parts as described, whereby the current entering through the valve is deflected upward against the sieve, and the lower part of the box A is left as a receptacle for small particles of sulphur and slate, all as set forth.

5. In a coal-washing apparatus, the combination, with the cam F, fixed upon the shaft *u*, of the guide *m*, connected to the piston-rod *r*, and closely embracing said cam and shaft, as set forth.

SEBASTIAN STUTZ.

Witnesses:
L. W. SEELY,
JOHN T. ARMS.